V. R. KOONTZ.
CUTTER HEAD AND MECHANISM FOR ACTUATING THE DIES THEREOF.
APPLICATION FILED FEB. 12, 1912.
1,048,081.
Patented Dec. 24, 1912.
2 SHEETS—SHEET 1.
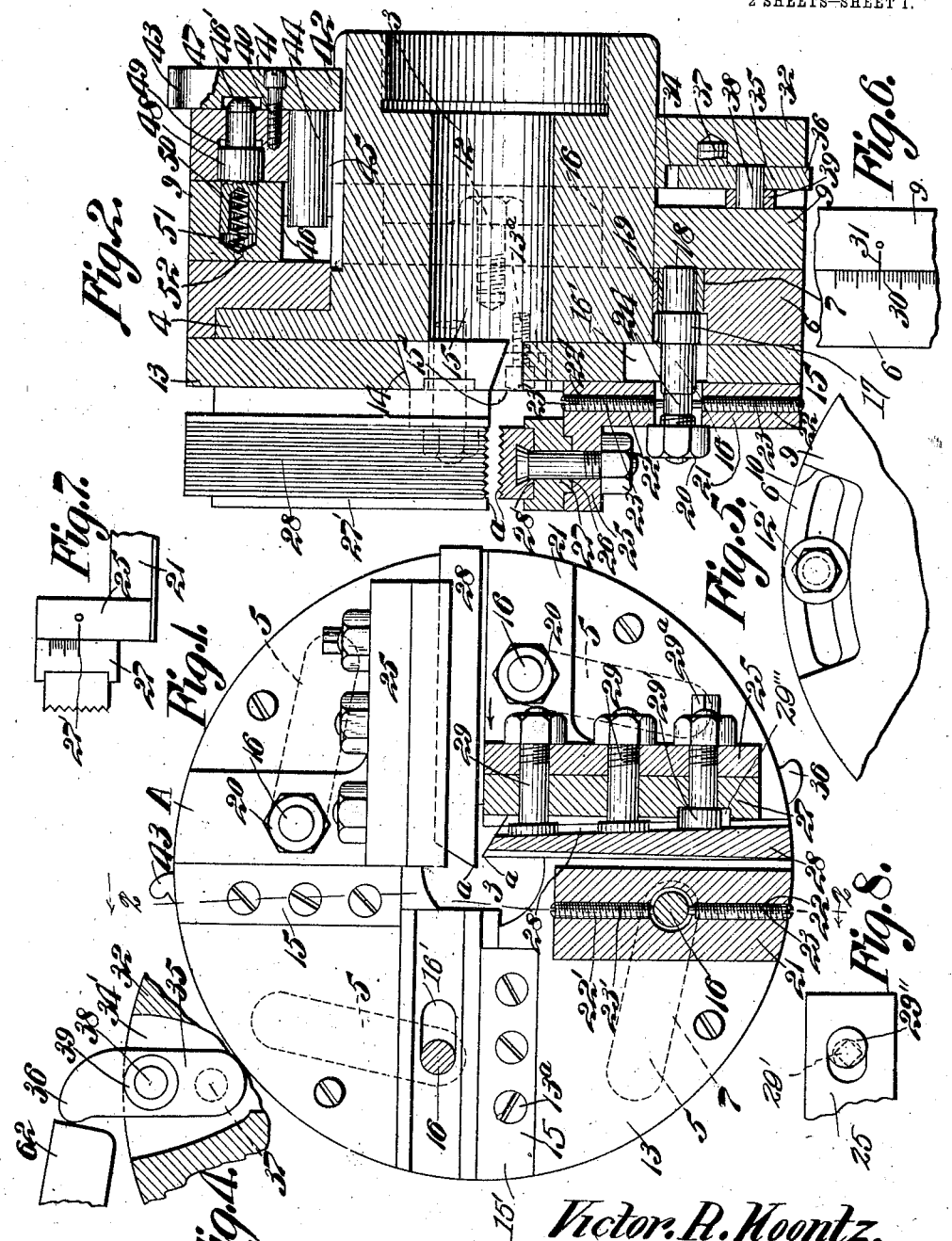
Witnesses
Victor R. Koontz,
Inventor
by C.A. Snow & Co.
Attorneys V. R. KOONTZ.
CUTTER HEAD AND MECHANISM FOR ACTUATING THE DIES THEREOF.
APPLICATION FILED FEB. 12, 1912.
1,048,081.
Patented Dec. 24, 1912.
2 SHEETS—SHEET 2.
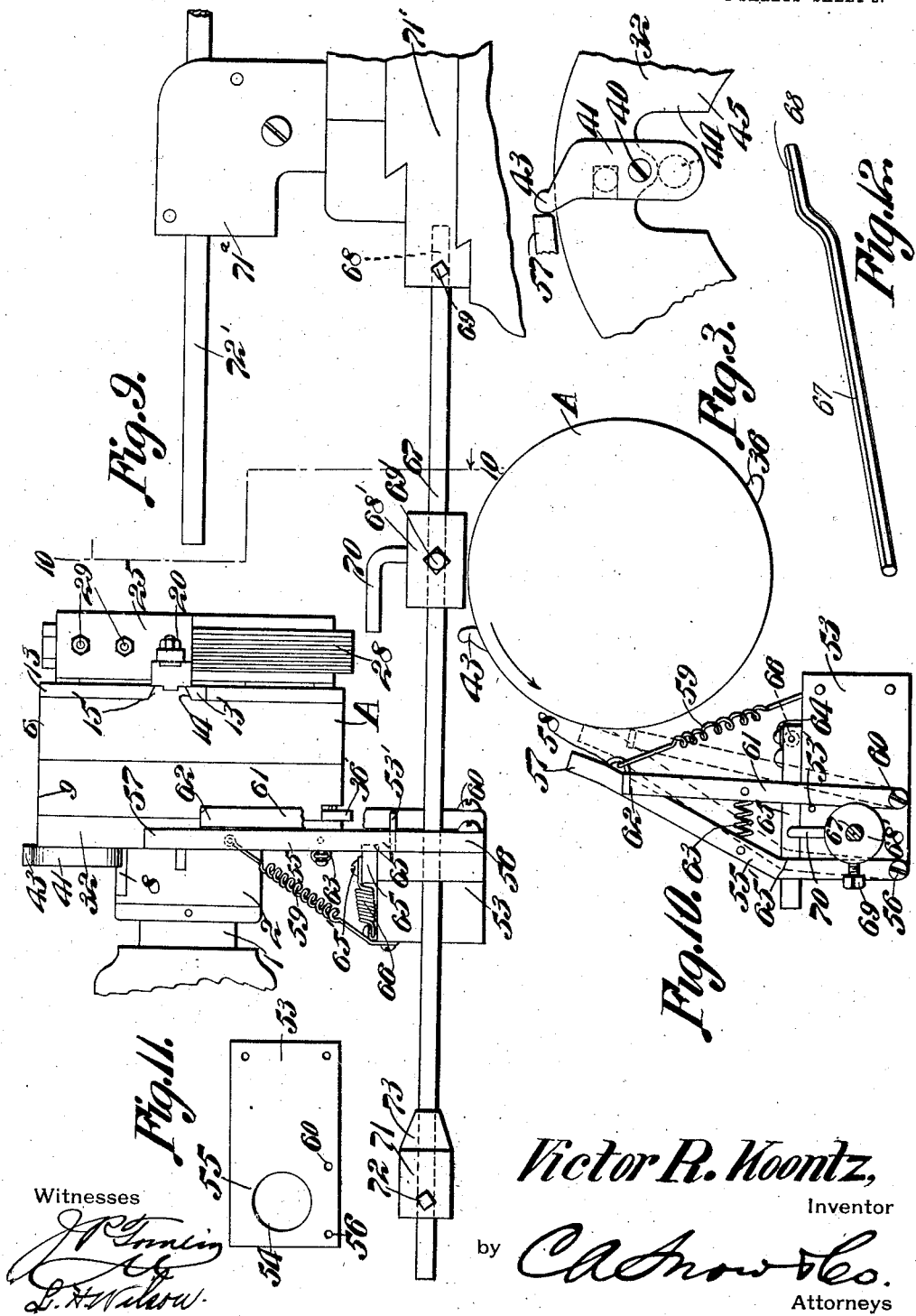
Victor R. Koontz,
Inventor
Witnesses
by C. A. Snow & Co.
Attorneys

UNITED STATES PATENT OFFICE.

VICTOR R. KOONTZ, OF WAYNESBORO, PENNSYLVANIA, ASSIGNOR OF ONE-HALF TO JOHN H. GEHR, OF WAYNESBORO, PENNSYLVANIA.

CUTTER-HEAD AND MECHANISM FOR ACTUATING THE DIES THEREOF.

1,048,081.

Specification of Letters Patent. Patented Dec. 24, 1912.

Application filed February 12, 1912. Serial No. 676,976.

*To all whom it may concern:*

Be it known that I, VICTOR R. KOONTZ, a citizen of the United States, residing at Waynesboro, in the county of Franklin and State of Pennsylvania, have invented a new and useful Cutter-Head and Mechanism for Actuating the Dies Thereof, of which the following is a specification.

The present invention relates to improvements in cutter heads and mechanisms for actuating the dies thereof, the primary object of the invention being the provision of a novel form of cutter head having a plurality of radially disposed and slidable dies, for cutting threads upon cylindrical articles, the same being disposed to be connected to the spindle of a lathe, in combination with an automatic device controlled by the lathe carriage, for automatically moving the dies into cutting engagement with the article at the beginning of the movement of the carriage and for automatically opening the dies at the final movement of the carriage, such movement being determined relatively to the cut desired upon the article.

A further object of the invention is the novel form of die block and cutter adjusting mechanism, in which the desired pitch may be given the threads, the angle of the cutting edge of the die being adjustable at will and in ready access at the outer face of the cutter head.

A still further object of the present invention is the novel construction and arrangement of a plurality of disks or rings mounted upon the main portion of the die head and carrying a plurality of slidably mounted die blocks so constructed and arranged as to be moved into and out of work engaging position and held in either position during the rotation of the spindle of the lathe, a novel form of automatic device for controlling the opening and closing of the dies being operably connected to the carriage of the lathe and adjusted so as to regulate the distance of movement of the die upon the work before the dies are moved from the work at the end of the cutting operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a front elevation of the cutter head with two die blocks in position, one of which is in section, the other portion of the cutter head showing the receptacles for the other two remaining die blocks. Fig. 2 is a section taken on line 2—2 of Fig. 1, showing one of the cutters or dies in elevation and another in cross section. Fig. 3 is an enlarged detail elevation of a mechanism for opening the dies. Fig. 4 is a similar view of the mechanism for closing the dies. Fig. 5 is a detail view of the adjusting device between the main members of the cutter head, there being two of these to each cutter head. Fig. 6 is a plan view of a portion of the main members of the cutter head showing the graduated scale to be used in connection with the device as shown in Fig. 5. Fig. 7 is a detail elevation of one of the die blocks, its adjustable carrier in position. Fig. 8 is a detail view of the swivel adjusting screw. Fig. 9 is a front elevation of a lathe spindle, the cutter head, and lathe carriage with the device for automatically controlling the opening and closing of the dies. Fig. 10 is a view taken on section line 10—10 of Fig. 9 looking in the direction of the arrow. Fig. 11 is a detail view of the block for retaining the actuating levers of the mechanism for controlling the opening and closing of the dies. Fig. 12 is a detail view of the slidable rod carried by the lathe carriage and for actuating the opening and closing mechanism.

Referring to the drawings, the numeral 1 designates the lathe spindle which has mounted thereupon the main member 2 of the die head, the same being provided with the central bore 3 for the reception of the spindle 1 and being provided with the flange plate 4 having the four slots 5 as clearly shown in dotted lines Fig. 1, said slots being open to the outer rim of the flange plate 4, the purpose of which will later appear.

Mounted for a slight rotation or oscillation upon the cylindrical portion 2 of the die head at the rear of the flange plate 4 is a ring or annular plate 6 provided with the four slots 7 which are so formed as to provide a cam slot to actuate the cutters 28 when the said ring 6 is oscillated as will later appear. Mounted adjacent to the ring 6 and also capable of an oscillatory movement is the main die actuating plate 9 which is recessed as at 10 and is provided with the curved slot 11 for the reception of the headed bolt 12 which is fast to the ring 6 and is readily loosened and tightened for the desired adjustment by means of the head 12' clearly shown in Fig. 5. There are two of these to each cutter head arranged in diametrically opposite positions and in ready access for the introduction of a set wrench from the outside into the recess 10, so that the ring 6 may be adjusted with relation to the ring 9 and according to the graduations 30 and 31 carried by said rings and illustrated in Fig. 6.

Carried upon and being properly secured to the outer face of the flange plate 4, is the die block carrying disk or plate 13 which is provided with the dove tail grooves 14, there being four in number, the gib or wedge 15' being mounted within the plate 13, one to each dove tail groove 14 and held in place by means of the three screws 13ª to properly retain the dove tail in cross section supporting plate 15 of the die blocks 21.

The outer faces of the plate 15 are provided with the grooves 15' for the sliding reception of the die blocks 21 and in order to hold the said die blocks relatively thereto and yet permit them the desired sliding movement, the bolts 16 are passed through the slots 16' of the plate 13. Each bolt 16 is provided with the enlarged portion 17 mounted in each slot 5 of the base plate 13 and having its reduced stem 18 provided with the anti-frictional roller 19 and disposed within each slot 7 of the ring 6. These bolts 16, as clearly shown, have their outer ends projected through the die block support 21 and are clamped in proper relation thereto by means of the nuts 20, said die block support 21 being provided with the oppositely disposed threaded bores 22 and 22', for the reception of the adjusting screws 23 and 23', whose inner ends engage the reduced portion 24 of the respective bolts 16 and thereby provide an adjusting means to limit the positioning of the bolts 16 within the bore of the die block support 21. Formed integral with this die block support 21 is a plate 25 whose outer face is grooved as at 26 for the sliding reception of the swivel plate 27, the outer face of which plate is also provided with a groove for the reception of the die 28. The inner face of the die 28 is provided with a wedge-shaped dovetail groove 28' for the reception of the heads of the respective bolts 29 and 29', there being two bolts 29 and one bolt 29'. The bolt 29' is provided with the eccentric head 29'' which is disposed within the wider portion of the wedge-shaped groove 28' of the die 28 and also in the recess 29''' while the reduced shouldered end 29ª of the bolt 29 is disposed exteriorly of the plate 25 so that the eccentric may be turned to adjust and regulate the projection of the cutting ends a of the cutters 28 with relation to the work.

The rear plate 32 is rigidly connected to the die head support 2 by means of two set screws (not shown), thus providing a means to retain the rings 6 and 9 relatively in position and at the same time provide a rigid support for the die actuating or opening and closing mechanism.

Provided in the rear face of the ring 9 are a plurality of recesses 34, while provided in the face of the stationary plate 32 adjacent to such recesses 34, are recesses 34' for the reception of the die closing lever 35. This lever 35 is provided with the projecting end 36, which projects exteriorly of the cutter head, the same being held in operable relation by means of the pin 37 which pivots the said lever 35 to the stationary plate 32, while the pin 38 which carries the anti-frictional roller 39 disposes said roller within the groove 34 of the oscillatory ring 9, so that the movement of the said lever 35 will impart the desired movement to the ring 9 as will later appear.

The die-opening-lever 41 is connected by a screw 40 to the stationary plate 32 at a diametrically opposite point to the lever 35 and has its inner end 42 disposed within the slots 5 of the die head supporting member 2 while its outer operating end 43 projects exteriorly of the cutter head, the purpose of which will later appear. This lever 41 is provided with an inwardly projecting pin 44 which projects through the peculiar shaped recess 45 formed in the ring 32 and enters the recess or slot 46 of the oscillatory ring 9, thus providing a means whereby the said ring 9 may be oscillated in the opposite direction to that of the lever 35 to open the dies 28, or in other words to cause the recession of said dies from the work after the threads have been cut thereupon.

In order to properly lock the rings 6 and 9 in die closed position and also permit the release thereof, so that at the proper time the said dies may be opened to release the work operated upon, the lever 41 is provided with the cam recess 46', which is disposed in the path to be engaged by and engage the outer end of the slidably mounted pin 47, which is mounted within the recess 49 of the stationary plate 32 and is provided with the enlarged head 48 disposed in the path to be engaged by the spring projected pin 50 mounted within the recess 51 of the ring 9, the spring 52 being so disposed, as at the proper time, to move the pin 50 forwardly and into engagement with the head 48 of the pin 47, so that the outer end of the pin 47 will be projected beyond the outer face of the stationary plate 32 and into the cam recess 46' to lock the lever 41.

In order to automatically operate the cutter heads so that the dies 28 may be moved into engaging position at the proper time and be locked thereat, and at the end of the operation to be automatically released from engagement with the work and moved thereaway from, the mechanism as clearly shown in Figs. 9, 10, 11 and 12 is provided. This mechanism consists essentially of a block 53 which is connected to the lathe frame (not shown) and in line with the spindle 1 and the cutter head A. This block 53 is provided with the aperture 54, while pivotally connected to said block is the die opening lever 55 whose lower end 56 is pivotally connected to the block, while its upper end 57 is disposed to be thrown into and out of engagement with the trigger or projecting end 43 of the die opening lever 41. An eye 58 is connected to the lever 55 so that a spring 59 may connect the same to the block 53 and thus normally exert a tension upon the outer end of the lever 57 toward the die cutter A.

At 60 is pivotally connected the die closing lever 61 whose upper free end 62 is disposed to be thrown in the path to engage the trigger projecting end 36 of the die closing lever 35. A spring 63 is connected to both levers 55 and 61, and normally exerts a tension to hold the lever 61 outwardly in the position as shown in full lines Fig. 10.

In order to lock the lever 55 outwardly in the position as shown in Fig. 10, a latch trigger 65 is pivoted to the block 53 at 64, the same being provided with the recessed end 65' to engage the inner face of the lever 55, the spring 66 being connected to the inner end of the trigger 65 so as to hold the recessed portion 65 in such position. A pin 53' is connected to the block 53 and provides a means to limit the movement of the lever 61 away from the cutter head A.

In order to actuate the respective levers 55 and 61 to move the same to and from the cutter head A, a rod 67, provided with the off set end 68, is connected by means of the set screw 69 to the lathe carriage 71 and is therefore oscillated operable to the cutter head A during the movement of the work 72 to and from the cutter head A. The sleeve 68' is adjustably mounted by means of the screw 69' upon the rod 67 and carries the L-shaped arm 70 which is projected in the path to engage, when the carriage is moved to the left as viewed in Fig. 9, the trigger 65, and thus at the proper time to move the trigger out of engagement with the lever 55 to permit the spring 59 to throw the free end 57 of the lever 55 into engagement with the periphery of the stationary disk 32 of the cutter head A and in the path to engage the trigger 43 so as to operate the lever 41 whose pin 44 will move the oscillatory ring 9 and all four of the bolts 16. This action will, due to the slots 7, move the cutters 28 out of engagement with the work 72. The movement of the rod 67 in the opposite direction, during the retraction of the work 72 and the removal thereof from the lathe, will bring the sleeve 71, which is adjustably mounted upon the rod 67 by means of the set screw 72, so that its cone end 73 will enter the aperture 54 of the block 53, engaging both levers 55 and 61, and release the lever 55 from engagement with the trigger 43, and simultaneously throw the free end 62 of the lever 61 into engagement with the periphery of the stationary disk 32 and in line to engage the trigger 36 of the die closing lever 35.

The spring 52, shown in Fig. 2, when the ring 9 rotates so that the pins 47 and 50 aline, as before stated forces the pin 50 into the space of the ring 32 and consequently engage the pin 47, which in turn retains the rings 6 and 9 into locked engagement within the closure of the dies 28 and the cutting of the work 72'.

When the lever 41 contacts with the free end 57 of the lever 55, the cam recess 46' thereof will act upon the outer end of the pin 47 slightly in advance of the pin 44 coming in contact with the ring 9, but as soon as the ring 9 has been moved by the pin 44, the pin 50 will engage the ring 9 and assist in moving it to open the dies 28.

What is claimed is:

1. A cutter head, having a spindle receiving member provided with an annular flange upon one end, a ring fitting upon the reduced end of the member and held in spaced relation to the flange, a die block carrying plate fixedly connected to the outer face of the annular flange, a plurality of die blocks mounted for sliding movement in the outer face of the die block carrying plate, two rings mounted for oscillation upon the spindle receiving member between the ring and the annular flange, adjustable means for locking the two rings together, connecting means between the oscillatory rings and the die block for sliding the die blocks when the rings are oscillated, and means mounted upon the first ring and connected to the adjacent oscillatory ring for oscillating both rings to cause the die blocks to be slid into and out of work engaging position.

2. A cutter head, having a hollow cylindrical carrying member provided with an annular flange upon one end, a ring mounted for oscillation upon the cylindrical portion and held against outward movement by the flange, another ring adjustably connected to the first ring and movable therewith, a plate fast to the outer face of the annular flange, a plurality of bolts mounted for sliding movement in the last plate and operably connected to the oscillatory ring, said bolts having a sliding movement imparted thereto when the rings are oscillated, a die block to each bolt slidably mounted upon the fixed plate, a ring fixed upon the cylindrical portion of the carrying member, said ring and annular flange co-acting to retain the oscillatory rings positioned upon the carrying member, and means mounted upon the stationary ring and operably connected to the oscillatory rings for oscillating said rings to move the die blocks into and out of work engaging position.

3. A cutter head, having a spindle receiving member provided with an annular flange upon one end, a ring fitting upon the reduced end of the member and held in spaced relation to the flange, a die block carrying plate fixedly connected to the outer face of the annular flange, a plurality of die blocks mounted for sliding movement in the outer face of the die block carrying plate, two rings mounted for oscillation upon the spindle receiving member between the ring and the annular flange, adjustable means for locking the two rings together, connecting means between the oscillatory rings and the die blocks for sliding the die blocks when the rings are oscillated, and two devices mounted at different points upon the stationary ring and engaging the oscillatory rings, both of said devices being operable in the same direction, one of said devices causing the die blocks to be moved into work engaging position, while the other device causes the die blocks to be moved out of work engaging position.

4. A cutter head, having a hollow cylindrical carrying member provided with an annular flange upon one end, a ring mounted for oscillation upon the cylindrical portion and held against outward movement by the flange, another ring adjustably connected to the first ring and movable therewith, a plate fast to the outer face of the annular flange, a plurality of bolts mounted for sliding movement in the last plate and operably connected to the oscillatory ring, said bolts having a sliding movement imparted thereto when the rings are oscillated, a die block in each bolt slidably mounted upon the fixed plate, a ring fixed upon the cylindrical portion of the carrying member, said ring and annular flange co-acting to retain the oscillatory rings positioned upon the carrying member, and two devices mounted at different points upon the stationary ring and engaging the oscillatory rings, both of said devices being operable in the same direction, one of said devices causing the die blocks to be moved into work engaging position, while the other device causes the die blocks to be moved out of work engaging position.

5. A cutter head for attachment to a lathe spindle, having a carrying member provided with an annular flange at one end, a ring secured to the member and in spaced relation to the flange, a plate secured to the outer face of the flange, a plurality of die blocks slidably mounted on said plate, a member capable of oscillatory movement mounted upon the carrying member between the flange and ring, die block connecting means operably connecting the die blocks and oscillatory member together, a lever carried by the stationary ring and connected to the oscillatory member to actuate the oscillatory member to cause the die blocks to be moved into work engaging position, and another lever also carried by the stationary ring and operably connected to the oscillatory member for moving the member to cause the die blocks to be moved out of work engaging position.

In testimony that I claim the foregoing as my own, I have hereto affixed my signature in the presence of two witnesses.

VICTOR R. KOONTZ.

Witnesses:
JOHN H. GEHR,
JOSEPHINE ROLLMAN.